No. 769,513.

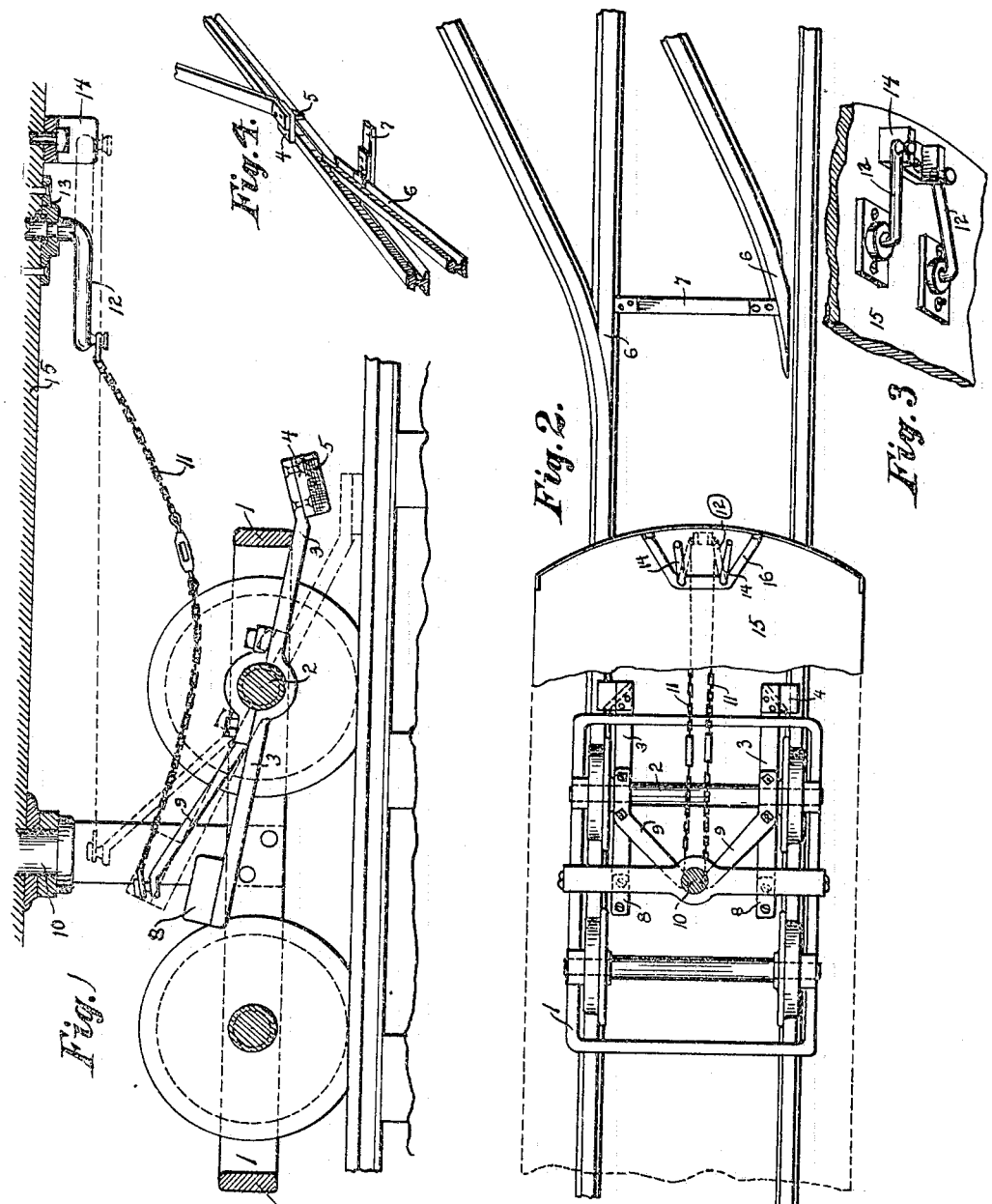

Patented September 6, 1904.

UNITED STATES PATENT OFFICE.

CORT W. TOWNSEND, OF NEW PHILADELPHIA, OHIO.

SWITCH-OPERATING DEVICE.

SPECIFICATION forming part of Letters Patent No. 769,513, dated September 6, 1904.

Application filed June 28, 1904. Serial No. 214,445. (No model.)

*To all whom it may concern:*

Be it known that I, CORT W. TOWNSEND, a citizen of the United States, residing at New Philadelphia, in the county of Tuscarawas and State of Ohio, have invented certain new and useful Improvements in Switch-Operating Devices; and I do hereby declare that the following is a full, clear, and exact description of the same, reference being had to the annexed drawings, making a part of this specification, and to the numerals of reference marked thereon, in which—

Figure 1 is a side view of a truck, showing the truck partially in section. Fig. 2 is a top view of the truck and illustrating a portion of the car-platform. Fig. 3 is a view showing the bottom or under side of a portion of the car-platform and illustrating the position of the switch-shifting arms and their stop-block. Fig. 4 is a view showing a portion of one of the railway-rails, showing a portion of the tongue or switch-rail, also showing the tongue-shifting shoe.

The present invention has relation to switch-operating devices; and it consists in the different parts and combination of parts hereinafter described, and pointed out in the claims.

Similar numerals of reference indicate corresponding parts in all the figures of the drawings.

In the accompanying drawings, 1 represents the truck-frame, which may be of any desired construction, inasmuch as the frame within itself forms no particular part of the present invention, except that a truck is of course necessary to carry out the object and purpose hereinafter described. Upon the axle 2 is pivotally mounted the bar 3, which bar is extended forward and backward of the axle, as best illustrated in Fig. 1. To the front or forward end of the bar 3 is attached the shoe 4, to which shoe is attached the tongue switch-blade 5, which tongue switch-blade is located at an angle, the angularity being such that it will cause the switch-tongue 6 to be moved to close the switch in the ordinary manner. It will be understood, however, that in the construction of switches the switch-tongues or movable rails should be connected together by means of the rod 7, by which arrangement the movement will be alike to both the switch-tongues or rails. The mechanism pertaining to the track and switch has no particular relation to the present invention, and hence no detailed description is deemed necessary.

The rear end of the bar 3 is provided with the counterweight 8 and is for the purpose of holding the front or forward end of the bar 3 up and away from the track, as illustrated in Fig. 1. To the bar 3 is attached in any convenient and well-known manner the rearward-extending arm 9, which rearward arm is so arranged that its rear end will be near the vertical pivoted point of the truck to the car, which pivot connection is made by an ordinary king-bolt 10. To the arm 9 is attached in any convenient and well-known manner the chain 11, which chain is extended forward and its forward end connected to the crank 12, found upon the bottom or lower end of the shaft 13, which shaft extends upward and is provided with the operating-handle 14. It will be understood that when the operating-handle is thrown forward it will move the crank 12 forward, which rocks the bar 3, thereby bringing the shoe 4 down upon the track-rail and bringing the switch-shifting blade 5 in proper position to move the switch-tongue 6.

For the purpose of holding the shoe, together with its blade, in proper position to operate the switch the stop-block 14 is provided, which stop-block is located upon the bottom or under side of the car-platform 15 and in such a position that it will stop the crank 12 after it has been thrown over the center. After the switch-tongue has been acted upon by the blade 5 the crank 12 is brought into the position illustrated in Fig. 1, and when in the position shown the counterweight 8 will automatically elevate the shoe and switch-blade.

The object and purpose of pivoting the bar 3 and the axle 2 is to prevent any up-and-down movement of the bar by reason of the oscillation or other movement between the truck and car-body. The object and purpose of locating the rear end of the arm 9 near the vertical pivoted point of the truck to the car is to prevent any variation of distance to any great degree between the connecting ends of the chain 11 by reason of the movement of the car over a curved track. It is well understood that car-trucks follow the curve of the track; but when passing over a curve the body of the car does not follow the curve of the track to the same degree as the truck.

It will be understood that for the purpose of holding the upper end of the shaft 13 the bracket 16 is employed. I have illustrated this bracket in the centered portion of the car-platform; but it will be understood that it may be moved to one side of the center, if desired.

I do not desire to be limited to the exact location of the bar 3, owing to the fact that in some makes of cars the gearing may be so arranged or the motor so located that the bar 3 may have to be located at some point between the wheels other than shown. The shoe 4 is so formed that when the bar 3 is thrown downward at its forward end the bottom or under side of said shoe will ride upon the top of the railway-rail.

In the drawings I have illustrated pivoted bars on each side of the truck, but in the description have treated the invention as pertaining to a single bar, owing to the fact that one is simply the duplication of the other.

Having fully described my invention, what I claim as new, and desire to secure by Letters Patent, is—

1. In a switch-operating device, the combination of a car-axle having pivotally mounted thereon a bar, said bar provided with a shoe and a switch-operating blade, a counterbalance, an operating-arm extended rearward and near to the vertical pivotal point of the car-body, and means for operating the arm, substantially as and for the purpose specified.

2. In a switch-operating device, a bar pivotedly attached to a car-axle and extended forward and rearward of the axle, the forward end or portion provided with a shoe and a switch-operating blade, and the rearward portion provided with a counterweight, and means for operating the bar carrying the counterweight and shoe, substantially as and for the purpose specified.

3. In a switch-operating device, a car-truck and a car-body, a bar adapted to oscillate upon one of the truck-axles, said bar provided with a switch-throwing blade, an arm connected to the oscillating bar, a chain connected to the arm, a shaft provided with an operating-handle and a crank, said chain connected to the crank, and a stop-block adapted to arrest the movement of the crank in one direction, substantially as and for the purpose specified.

In testimony that I claim the above I have hereunto subscribed my name in the presence of two witnesses.

CORT W. TOWNSEND.

Witnesses:
J. A. JEFFERS,
F. W. BOND.